/ United States Patent (12)
Kil

(10) Patent No.: US 7,801,095 B2
(45) Date of Patent: Sep. 21, 2010

(54) APPARATUS AND METHOD FOR DETECTING DATA TRANSMISSION MODE OF ACCESS POINT IN WIRELESS TERMINAL

(75) Inventor: Tae-Young Kil, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1005 days.

(21) Appl. No.: 11/495,502

(22) Filed: Jul. 31, 2006

(65) Prior Publication Data
US 2007/0060128 A1    Mar. 15, 2007

(30) Foreign Application Priority Data
Aug. 19, 2005  (KR) .............. 10-2005-0076308

(51) Int. Cl.
H04W 4/00    (2009.01)
H04W 72/00   (2009.01)
H04J 3/16    (2006.01)
H04J 3/24    (2006.01)

(52) U.S. Cl. ............... 370/338; 370/346; 370/349; 455/452.2

(58) Field of Classification Search ......... 380/277; 455/450, 410, 411, 418, 452.2; 370/338, 370/346, 349
See application file for complete search history.

(56) References Cited

U.S. PATENT DOCUMENTS 7,359,363 B2 * 4/2008 Sakai ...................... 370/338
7,519,183 B2 * 4/2009 Adachi et al. ............. 380/270
2003/0097473 A1 * 5/2003 Saitoh ...................... 709/245
2003/0214905 A1 * 11/2003 Solomon et al. ........... 370/229
2004/0137905 A1 * 7/2004 Jeong et al. ............... 455/450
2005/0037733 A1 * 2/2005 Coleman et al. .......... 455/411
2005/0152305 A1 * 7/2005 Ji et al. .................... 370/328
2006/0034461 A1 * 2/2006 Park ........................ 380/277
2006/0041737 A1 * 2/2006 Kumagai .................. 713/1
2006/0149858 A1 * 7/2006 Bhesania et al. ............ 710/5
2006/0187873 A1 * 8/2006 Friday et al. .............. 370/328
2008/0031185 A1 * 2/2008 Bims ........................ 370/328
2008/0119184 A1 * 5/2008 Rebo et al. ................ 455/433
2009/0129386 A1 * 5/2009 Rune ........................ 370/392
2009/0235077 A1 * 9/2009 Cam Winget et al. ...... 713/171
2009/0296658 A1 * 12/2009 Calhoun et al. ........... 370/331

OTHER PUBLICATIONS

"IEEE Wireless Communications: *Wireless LAN Security and IEEE 802.11i*", to Chen, et al. vol. 12, Feb. 2005.

* cited by examiner

*Primary Examiner*—Rafael Pérez-Gutiérrez
*Assistant Examiner*—Allahyar Kasraian
(74) *Attorney, Agent, or Firm*—H.C. Park & Associates, PLC

(57) ABSTRACT

An apparatus and method for detecting a data transmission mode of an access point (AP) in a wireless terminal is provided. When the AP switches the data transmission mode in a state where a Wi-Fi wireless link is connected between the AP and the wireless terminal or not, the AP transmits the mode switched information to the wireless terminal with the information carried on the arbitrary field in any one of the Beacon, Probe Response, Association Response messages, and the wireless terminal compares the mode switched information included in the transmitted message with the currently set data transmission mode, switches the mode, attempts re-connection to the AP in the switched mode, and performs the Wi-Fi wireless link connection with the AP. Thereby, it is possible to provide data telecommunication services without interruption.

8 Claims, 2 Drawing Sheets

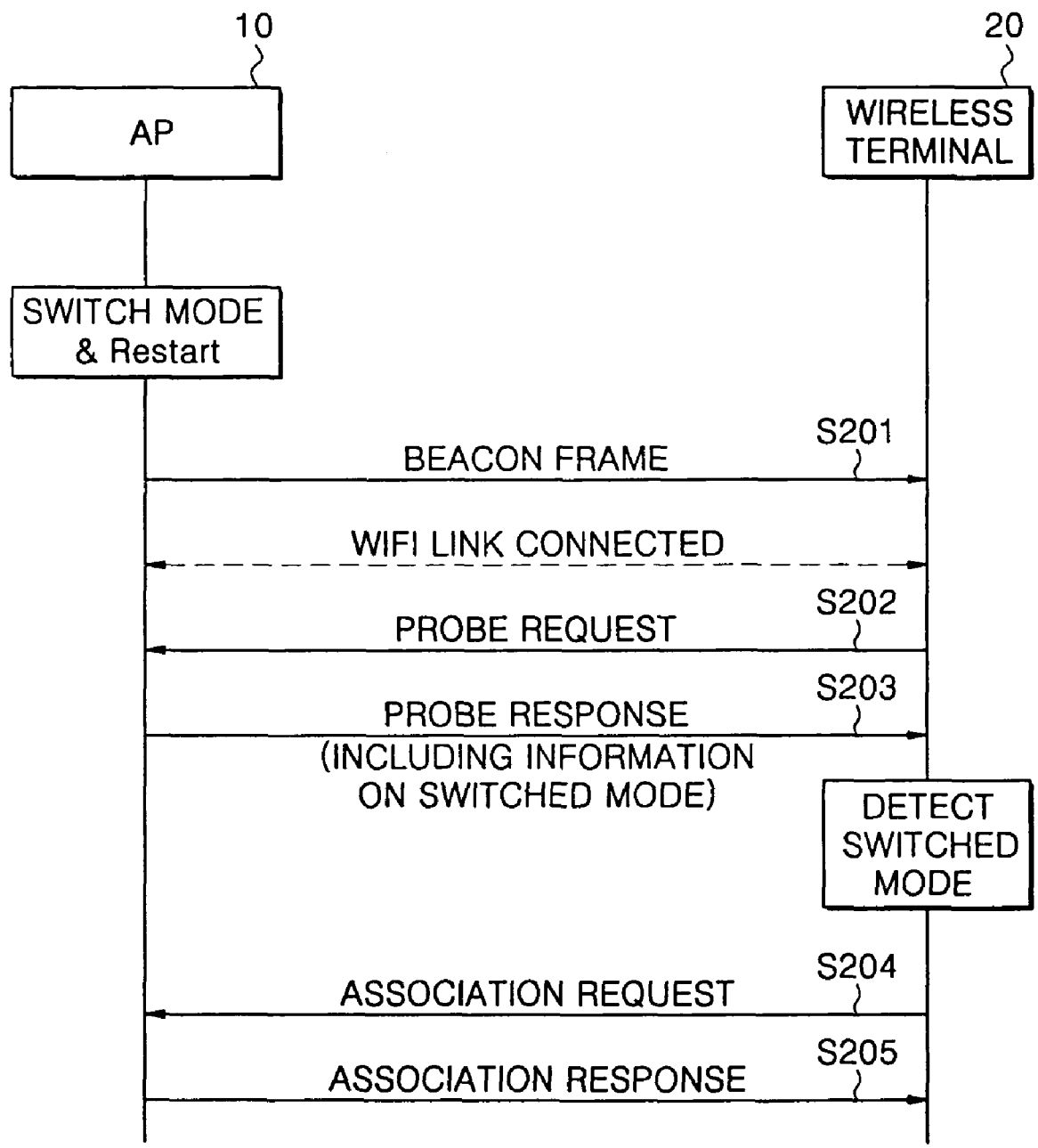

APPARATUS AND METHOD FOR DETECTING DATA TRANSMISSION MODE OF ACCESS POINT IN WIRELESS TERMINAL

CLAIM OF PRIORITY

This application makes reference to, incorporates the same herein, and claims all benefits accruing under 35 U.S.C. §119 from an application for APPARATUS AND METHOD DETECTING DATA TRANSMISSION MODE OF ACCESS POINT IN WIRELESS TERMINAL earlier filed in the Korean Intellectual Property Office on 19 Aug. 2005 and there duly assigned Serial No. 10-2005-0076308.

BACKGROUND OF THE INVENTION

1. Field of the Invention

The present invention relates to an apparatus and method for detecting a data transmission mode of an access point in a wireless terminal.

2. Description of the Related Art

In general, a wireless local area network (LAN) refers to a data telecommunication system implemented by expansion of a wired LAN, which is technology transmitting and receiving data in the air without connecting cables and using radio frequency technology.

Such a wireless LAN (WLAN) can be connected with Internet using a wireless repeater, namely an access point (AP). For example, in the case of general homes, the wireless LAN can share an Internet line by engrafting an Internet sharing function.

A Wi-Fi (short for "wireless fidelity" (WiFi)) terminal is used to engraft the wireless LAN on VoIP (Voice over Internet Protocol) technology, which is an Internet phone for making it possible to use Internet telephony in a wireless LAN environment.

In order to provide call access to a terminal at a different location, the Wi-Fi terminal should exchange messages for call processing with an external soft switch connected to the Internet through the AP (access point).

A current standard 802.11 for the wireless LAN defines a standard for data transmission in the wireless LAN environment, as well as various security protocols in order to cope with several security problems. These security protocols are mainly not only for preventing the eavesdropping of data transmitted from the AP to the Wi-Fi terminal, wireless terminal, but also preventing data from be transformed in an illegal fashion. In addition, the security protocols are directed to serving to exercise control over connection to a wireless LAN system.

In order to perform these purposes, that is, in order to prevent the eavesdropping, loss, deformation, etc. of the data when the data is transmitted at the AP, a data transmission mode is switched into an encrypt mode (hereafter: security mode). In addition, the data transmission mode is switched into a QoS mode for real-time transmission by assigning a priority according to a type of transmitted data to increase a throughput of voice or video traffic, and thereby the corresponding data is transmitted to the wireless terminal.

In this manner, when the data transmission mode is switched into the security mode or QoS mode at the AP, the wireless terminal of each user is reset and re-executed to the corresponding mode, or re-booted.

This approach enables the wireless terminal to scan the AP, to detect the corresponding mode, and to provide connection at the first time, but making it impossible for the wireless terminal to detect the mode of the AP when the mode of the AP is switched during provision of services, so that the wireless terminal does not communicate with the AP.

SUMMARY OF THE INVENTION

It is therefore an objective of the present invention to provide an apparatus and method for detecting a data transmission mode of an AP in a wireless terminal, in which the wireless terminal automatically detects switching of the mode when a security mode or QoS mode is switched at the AP and is reconnected in the switched mode, thereby providing data telecommunication services without interruption.

According to an aspect of a method for detecting a data transmission mode in a wireless local area network (LAN) system according to the present invention, the method comprises the steps of: when the data transmission mode is switched at an access point (AP), transmitting, by the AP, a first message including information on the switched data transmission mode to a wireless terminal through a network; and switching a currently set mode according to the first message including the switched data transmission mode information transmitted from the AP, and transmitting a second message for performing wireless link connection with the AP in the switched mode to the AP.

The data transmission mode may include any one of a Plaintext mode, a WEP (wired equivalent privacy) mode, a WPA (Wi-Fi protected access) mode, and a QoS mode.

The first message may be included in an arbitrary Information field of any one of Beacon, Probe Response, and Association Response messages, and the second message may be included in an arbitrary Information field of any one of Probe Request and Association Request messages.

In a state where no wireless link connection is provided between the AP and the wireless terminal, when switching the data transmission mode without performing restart, the AP may include the switched data transmission mode information in an arbitrary Information field of a Beacon frame, and transmit the included information to the wireless terminal.

The wireless terminal receiving the Beacon frame from the AP may parse the corresponding field to detect the switched mode, switch a currently set mode, transmits an Association Request message to the AP, and attempt the wireless link connection with the AP.

In a state where no wireless link connection is provided between the AP and the wireless terminal, when being restarted in a normal service state with the data transmission mode switched, the AP may transmit a Beacon message to the wireless terminal, and when receiving a Probe Request message from the wireless terminal according to the Beacon message, the AP may add the switched data transmission mode information in an arbitrary Information field of a Probe Response message, and transmit the added information to the wireless terminal.

When receiving the Beacon message from the AP, the wireless terminal may transmit the Probe Request message to the AP that is connected previously, and when receiving the Probe Response message including the switched data transmission mode information from the previously connected AP, the wireless terminal may parse the Information field in the Probe Response message to detect the switched mode, switch a currently set mode, transmits an Association Request message to the AP, and attempt the wireless link connection with the AP.

According to another aspect of a method for detecting a data transmission mode in a wireless local area network (LAN) system according to the present invention, the method comprises the steps of: in a state where no wireless link connection is provided between an access point (AP) and a wireless terminal, when the AP switches the data transmission mode without performing restart, including, by the AP, information on the switched data transmission mode in an arbitrary Information field of a Beacon frame, and transmitting the included information to the wireless terminal; and parsing, by the wireless terminal that receives the Beacon frame including the switched data transmission mode information from the AP, the corresponding Information field including the switched data transmission mode information to detect the switched mode, switches a currently set mode, transmits an Association Request message to the AP, and attempts the wireless link connection with the AP.

According to yet another aspect of a method for detecting a data transmission mode in a wireless local area network (LAN) system according to the present invention, the method comprises the steps of: in a state where no wireless link connection is provided between an access point (AP) and a wireless terminal, transmitting, by the AP, a Beacon message to the wireless terminal when being restarted in a normal service state with the data transmission mode switched; transmitting, by the wireless terminal receiving a Beacon message, a Probe Request message to the AP that is previously connected according to the Beacon message; when Probe Response message is received from the wireless terminal, adding, by the AP, the switched data transmission mode information to an arbitrary Information field of the Probe Response message, and transmitting the added information to the wireless terminal; and parsing, by the wireless terminal that receives the Probe Response message including the switched data transmission mode information from the AP, the Information field in the Probe Response message to detect the switched mode, switches a currently set mode, transmits an Association Request message to the AP, and attempts the wireless link connection with the AP.

Meanwhile, according to an aspect of a wireless local area network (LAN) system according to the present invention, the wireless LAN system comprises: an access point (AP) for, when switching a data transmission mode, transmitting a first message including information on the switched data transmission through a network; and a wireless terminal for switching a currently set mode according to the first message including the switched data transmission mode information transmitted from the AP, and transmitting a second message for performing wireless link connection with the AP in the switched mode to the AP. Here, the first message may be included in an arbitrary Information field of any one of Beacon, Probe Response, and Association Response messages, and the second message maybe included in an arbitrary Information field of any one of Probe Request and Association Request messages.

In a state where no wireless link connection is provided between the AP and the wireless terminal, when switching the data transmission mode without performing restart, the AP may include the switched data transmission mode information in an arbitrary Information field of a Beacon frame, and transmits the included information to the wireless terminal. The wireless terminal receiving the Beacon frame from the AP may parse the corresponding field to detect the switched mode, switch a currently set mode, transmit an Association Request message to the AP, and attempt the wireless link connection with the AP.

And, in a state where no wireless link connection is provided between the AP and the wireless terminal, when being restarted in a normal service state with the data transmission mode switched, the AP may transmit a Beacon message to the wireless terminal, and when receiving a Probe Request message from the wireless terminal according to the Beacon message, the AP may add the switched data transmission mode information in an arbitrary Information field of a Probe Response message, and transmit the added information to the wireless terminal.

When receiving the Beacon message from AP, the wireless terminal transmits the Probe Request message to the AP that is connected previously, and when receiving the Probe Response message including the switched data transmission mode information from the previously connected AP, the wireless terminal may parse the Information field in the Probe Response message to detect the switched mode, switch a currently set mode, transmit an Association Request message to the AP, and attempt the wireless link connection with the AP.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 illustrates flow of messages in a method for detecting a data transmission mode of an access point in a wireless terminal in accordance with a second embodiment of the present invention.

DETAILED DESCRIPTION OF THE PREFERRED EMBODIMENTS

Figure 1:
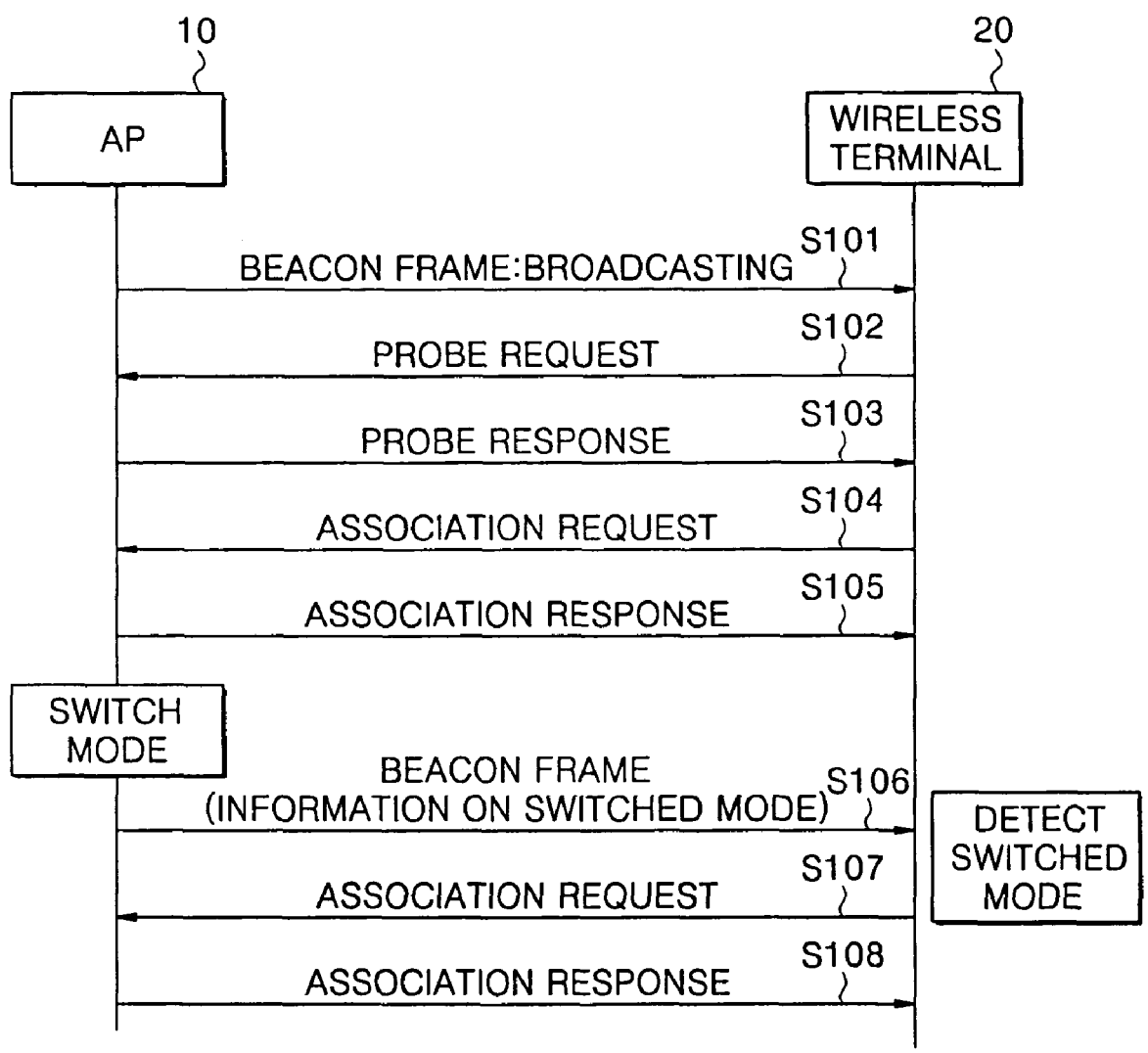
FIG. 1 illustrates flow of messages in a method for detecting a data transmission mode of an access point in a wireless terminal in accordance with a first embodiment of the present invention.

Hereinafter, an apparatus and method for detecting a data transmission mode of an access point in a wireless terminal in accordance with exemplary embodiments of the present invention will be described in detail with reference to the accompanying drawings.

As shown in FIGS. 1 and 2, a wireless terminal 20 of the present invention is a client capable of providing voice and data service to a user by connecting to an access point (AP) 10 according to IEEE standard 802.11. Here, the wireless terminal may include a Wi-Fi terminal, namely a Wi-Fi handset.

Further, the wireless terminal 20 supports security modes, such as, but not limited to, a WEP (Wired Equivalent Privacy) mode, or a WPA (Wi-Fi Protected Access) mode which are prescribed in the 802.11 standard, 802.11i standard, and Wi-Fi Alliance for the purpose of security of data transmitted/received within an wireless section.

The wireless terminal 20, also, supports a QoS mode prescribed in the 802.11e standard in order to support a priority to transmission of a desired access group by giving a different chance for transmission according to an access category of the wireless section. The access category may include voice, image, data, and so on.

Meanwhile, the AP 10 is connected to the wireless terminal 20 with the 802.11 standard to provide voice and data services in the wireless section, and is connected to a backbone network through an xDSL (Digital Subscriber Lines) or LAN.

The AP 10, also, supports the security modes such as the WEP mode, the WPA mode, etc. which are prescribed in the 802.11 standard, 802.11i standard, and Wi-Fi Alliance for the purpose of security of data transmitted/received within the wireless section.

And, the AP 10 provides a Web-based management function in order to manage Wi-Fi related parameters, and can change the aforementioned security modes.

Further, the AP 10 supports the QoS mode prescribed in the 802.11e standard in order to support a priority to transmission of a desired access group by giving a different chance for transmission according to an access category of the wireless section.

Prior to description of a detailed operation according to the present invention having this configuration, the security modes and QoS mode applied to the present invention will be described.

First, the security modes may be divided into a Plaintext mode, a WEP mode, and a WPA mode.

The Plaintext mode is a method of transmitting data used in the wireless section between the wireless terminal and the AP without change. In this case, any entity can be monitored in the wireless section.

The WEP mode is a security protocol defined in the Wi-Fi standard in order to provide the wireless LAN with security and secret safeguard to a level similar to one provided in the wired LAN. The wired LAN can be generally protected by a physical security procedure, for instance, as controlling entrance and exit with respect to a building. However, in the case of the wireless LAN, a radio wavelength used for a specific network is restricted by a wall, so that such a security mode is not effective. The WEP encrypts the data transmitted through the wireless LAN, thereby pursuing the safeguard similar to one provided in the physical security measures of the wired network. The encryption of data protects a weak wireless link between the client and the AP. Once the encryption is performed, other ordinary LAN security procedures, such as protection of codes, encryption of entire sections, VPN (Virtual Private Network), and authentication, may be carried out in order to ensure protection of the secret.

The WEP mode encrypts and transmits a user's data using a key of fixed length between the wireless terminal 20 and the AP 10. All the wireless terminals 20 connected to the same AP make use of the same key, and thus the encryption becomes insignificant between the terminals connected to the same AP 10. That is to say, there is a drawback that, although the encryption is made between the terminals connected to the same AP 10, it is susceptible to hacking or deformation. Further, there is another drawback that, although the key is not known, the data can be hacked by a simple method.

Meanwhile, the WPA mode is the state-of-the-art security standard mode developed for Wi-Fi wireless LAN users. The WPA is improved as compared with the WEP, the original Wi-Fi security standard, and thus expected to be a substitute for the WEP sooner or later.

The WPA provides more delicate encryption of the data than the WEP, as well as perfect user authentication unlike the WEP where it is rather insufficient to authenticate the user. The WEP is considered to be still effective for the home where the encryption is not very complicated, but to be insufficient for a company where the encryption key can be easily found due to a large-scale message stream.

The WPA employs TKIP (Temporal Key Integrity Protocol), part of the IEEE 802.11i encryption standard for wireless LANs, as an encryption technique. TKIP includes per-packet key mixing, a message integrity check, an extended initialization vector (IV), and a re-keying mechanism, thus fixing the flaws of WEP. In addition, the WPA provides strong user authentication on the basis of 802.1x and EAP (Extensible Authentication Protocol). The WPA makes use of a central authentication server, such as RADIUS (Remote Authentication Dial-In User Service), when authenticating each user.

The WPA may be a subset of the IEEE 802.11i security standard, which is currently being developed, and will maintain compatibility with the IEEE 802.11i encryption standard.

Consequently, the WPA mode is an industrial standard proposed in the Wi-Fi Alliance, which includes a WPA-PSK (Pre Shared Key) mode for resident users, and 802.1x/EAP of strengthening the authentication for enterprise users, and so on. The WPA mode uses a stronger encryption algorithm between the terminal and the AP using the TKIP as an encryption key, and enables dynamic variation of the key in the server.

And, a brief reference will be made to the QoS mode specified in the IEEE 802.11e.

The QoS mode aims at real-time transmission by assigning a different priority according to a type of data in the Wi-Fi wireless section, and increasing a throughput of voice and data traffic. In the case of the data traffic, the QoS mode is designed to be suitable for burst transmission by assigning a relatively lower priority. The related specification includes Windows media extensions (a.k.a.: Wireless Multimedia Enhancements) (WME), 802.11e, etc.

Hereinafter, description will be made about a method for detecting switching of the aforementioned mode at the wireless terminal when the mode is switched at the AP according to the present invention.

First, there are two methods for detecting the switching between the security mode and QoS mode: one for detecting the security mode or QoS mode which is switched while a currently connected AP 10 is connected, and the other for detecting the security mode or QoS mode while the AP is disconnected.

In general, when a related mode is switched on a management screen for changing parameters of the AP, the AP 10 is rebooted or soft-reset in order to apply the switching. In this case, a Beacon frame broadcast at the AP is not transmitted for a predetermined time.

Thus, when not receiving the Beacon frame from the currently connected AP for a predetermined time, the wireless terminal 20 recognizes this to be a "Disconnected" state that a link is not connected with the AP 10. Here, a "Disconnected" duration may be changed according to an algorithm for changing and applying parameters of the AP.

When the security mode or QoS mode is switched at the AP 10 during a current connection to the AP 10, the wireless terminal 20 continuously monitors a "Security/QoS Information" field of a Beacon frame transmitted from the currently connected AP 10. As a result, if it is determined the mode is switched at the AP 10, an application module of the wireless terminal 20 makes an attempt at re-connection to the AP 10 in a new mode. To be specific, the wireless terminal 20 continuously monitors the Beacon frame transmitted from the AP 10, parses a corresponding Security Information field or QoS Information field in the Beacon frame, compares mode switching data that is parsed with one that is currently set for the wireless terminal 20, determines whether or not the mode is switched on the basis of the compared result, and re-attempts connection to the AP 10 in the corresponding mode when the mode is switched.

Meanwhile, when switching the security mode or QoS mode in disconnection from the wireless terminal 20, the AP 10 transmits the Beacon frame to the wireless terminal 20 by periods (Beacon intervals), and the wireless terminal 20 receives the Beacon frame transmitted from the AP 10, thereby changing a Wi-Fi link with the AP 10 into a connected state.

And, the application module of the wireless terminal 20 transmits a "Probe Request" message to the previously connected AP 10, and the AP 10 receiving the message transmits a "Probe Response" message to the wireless terminal 20. Here, the AP 10 adds information on the switched mode to an arbitrary field in the "Probe Response" message transmitted to the wireless terminal 20.

Thus, the wireless terminal 20 detects the mode switched information, i.e. Security Information Elements or QoS Information Elements, included in the "Probe Response" message transmitted from the AP 10, and then attempts the re-connection to the AP in the detected mode. At this time, the AP 10 transmits the "Probe Response" message to the wireless terminal 20 by periods until it receives the "Probe Response" message when is changed into the state where the Wi-Fi link is connected.

As mentioned above, the mode switched information, i.e. Security Information Elements or QoS Information Elements, which is added at the AP 10 can be included and transmitted in any one of a Beacon message, a Probe Response Association message, and a Re-association message which are transmitted from the AP 10 to the wireless terminal 20. The mode switched information may be transmitted to the wireless terminal 20 according to each security mode as in the following Table 1.

TABLE 1

| | | |
|---|---|---|
| WEP mode | 802.11 Management Type | Privacy Enabled Flag Field of Capability Information |
| WPA mode | 802.11 Management Type | Element Field of TIM Information: 0xDD OUI: 0x00, 0x50, 0xF2, 0x01 |
| WME mode (QoS mode) | 802.11 Management Type | Element Field of TIM Information: 0xDD OUI: 0x00 0x50 0xF2 OUI Type: 0x02 OUI Sub Type: 0x01 |

Traffic Indication Map (TIM): An access point periodically sends the TIM within a beacon to identify which stations using power saving mode have data frames waiting for them in the access point's buffer. The TIM identifies a station by an association ID that the access point assigned during an association process.

When switching between the security mode and QoS mode, the AP 10 can transmit the mode switched information included in any one of the Beacon, Probe Response Association, and Re-association messages. The wireless terminal 20 detects the mode switching by monitoring the corresponding field in the message transmitted from the AP 10, as shown in Table 1, performs a mode switching procedure according to the mode switched information, and attempts the re-connection to the AP in the switched mode.

The method for detecting the data transmission mode of the AP in the wireless terminal as mentioned above will be described step by step with reference to FIGS. 1 and 2 based on each embodiment of the present invention.

First Embodiment

FIG. 1 illustrates flow of messages in a method for detecting a data transmission mode of an AP in a wireless terminal when the AP switches the mode in connection with the wireless terminal in accordance with a first embodiment of the present invention. That is, FIG. 1 shows the flow of messages in the method for detecting the data transmission mode when the mode is switched at the AP where no restart is needed.

As shown in FIG. 1, a method for detecting the switching of a mode in a wireless terminal in a state where an AP is connected to the wireless terminal (a Wi-Fi link connected state), namely in the case where no restart is needed at the AP when the mode is switched, the AP 10, first, transmits a Beacon frame to plurality of wireless terminals 20 in a broadcasting method (S101).

The wireless terminal 20 receiving the Beacon frame transmits a "Probe Request" message for searching for the AP 10 in order to connect a link (S102).

When receiving the "Probe Request" message from the wireless terminal 20, the AP 10 transmits a response message of the request message, i.e. a "Probe Response" message, to the wireless terminal 20 (S103).

Then the wireless terminal 20 receiving the "Probe Response" message transmits an "Association Request" message, for connecting a link with the corresponding AP 10, to the AP 10 (S104), and the AP 10 transmits an "Association Response" message to the wireless terminal 20 (S105), therey connecting the Wi-Fi link between the AP 10 and the wireless terminal 20.

In this state where the Wi-Fi link is connected between the AP 10 and the wireless terminal 20, when an security mode or QoS mode is switched, the AP 10 transmits a Beacon frame to the wireless terminal 20 in order to provide information on the switched mode to the wireless terminal 20. That is to say, the AP 10 transmits the Beacon frame to the wireless terminal 20 with the mode switched information added to an arbitrary field of Information fields of the Beacon frame (S106).

The wireless terminal 20 parses the Information fields in the Beacon frame transmitted from the AP 10, compares the corresponding information with pre-set old mode information, switches the old mode into a new mode, and attempts re-connection to the AP 10 in the new mode.

In other words, when detecting that the mode is switched from the Beacon frame transmitted from the AP 10, the wireless terminal 20 transmits an "Association Request" for the purpose of the re-connection in the switched mode (S106), and the AP 10 transmits a response message, i.e. an "Association Response" message, to the wireless terminal 20 (S107). Thereby, the Wi-Fi link is connected between the AP 10 and the wireless terminal 20 in the switched mode.

Second Embodiment

FIG. 2 illustrates flow of messages in a method for detecting a data transmission mode of an AP in a wireless terminal when the AP switches the mode in link-disconnection from the wireless terminal in accordance with a second embodiment of the present invention. That is, FIG. 2 shows the flow of messages in the method for detecting the data transmission mode when the mode is switched at the AP where a restart is needed.

First, in a state where no Wi-Fi wireless link is connected between the AP 10 and the wireless terminal 20, when the AP 10 performs mode switching and restart in order to begin service in a new mode again, the AP 10 transmits a Beacon frame for link connection with the wireless terminal 20 in a broadcasting method, and connects the Wi-Fi link with the wireless terminal 20 (S201).

In the Wi-Fi link connected state, an application module of the wireless terminal 20 transmits a "Probe Request" message to the AP 10 (S202), and the AP 10 receiving the "Probe Request" message transmits a "Probe Response" message to the wireless terminal 20 in response to the request message.

At this time, the AP 10 transmits the "Probe Response" message to the wireless terminal 20 with information on a switched mode added to an arbitrary Information field in the "Probe Response" message (S203).

The wireless terminal 20 parses the mode switched information added to the Information field of the "Probe Response" message transmitted from the AP 10, and detects whether the mode is switched or not by comparing it with mode information that is currently set for the AP 10.

When detecting that the mode is switched, the wireless terminal 20 re-connects to the AP 10 in the switched mode. That is, when detecting that the mode is switched from the AP 10, the wireless terminal 20 transmits an "Association Request" message to the AP 10 for the purpose of link connection in the new mode (S204), and the AP 10 receiving the "Association Request" message transmits an "Association Response" message to the wireless terminal 20 in response to this request message (S205). Thereby, the Wi-Fi wireless link is connected between the AP 10 and the wireless terminal 20 in the switched mode.

In the second embodiment, it is described that the mode switched information is added and transmitted to the "Probe Response" message when the mode is switched at the AP 10. However, it can be understood to those skilled in the art that the mode switched information could be added and transmitted in either the Beacon frame or the "Association Response" message.

Consequently, in the aforementioned apparatus and method for detecting the data transmission mode of the AP in the wireless terminal in accordance with the present invention, when the AP switches the data transmission mode in the state where the Wi-Fi wireless link is connected between the AP and the wireless terminal or not, the AP transmits the mode switched information to the wireless terminal, such information being carried on an arbitrary Information field in any one of the Beacon, Probe Response, Association Response messages, and the wireless terminal compares the mode switched information included in the transmitted message with currently set data of a previous transmission mode, switches the mode, and attempts re-connection to the AP in the switched mode, thereby performing the Wi-Fi wireless link connection with the AP.

As can be seen from the foregoing, the apparatus and method for detecting the data transmission mode of the AP in the wireless terminal in accordance with the present invention can provide data telecommunication services without interruption, by enabling the AP, when switching the data transmission mode in the state where the Wi-Fi wireless link is connected between the AP and the wireless terminal or not, to transmit the mode switched information to the wireless terminal, such information being carried on an arbitrary Information field in any one of the Beacon, Probe Response, Association Response messages, and by enabling the wireless terminal to compare the mode switched information included in the transmitted message with the currently set data transmission mode, switch the mode, attempt re-connection to the AP in the switched mode, and perform the Wi-Fi wireless link connection with the AP.

Although exemplary embodiments of the present invention have been described, it will be understood by those skilled in the art that the present invention should not be limited to the described exemplary embodiments. Rather, various changes and modifications can be made within the spirit and scope of the present invention, as defined by the following claims.

What is claimed is:

1. A method for detecting a data transmission mode in a wireless local area network system, the method comprising:

transmitting, by an access point (AP), a Beacon signal to a wireless terminal in a broadcasting method;

transmitting, by the wireless terminal, in response to receipt of the Beacon signal, a Probe Request message to the access point (AP), in order to connect a Wi-Fi link;

transmitting, by the access point (AP), a Probe Response message of the request message to the wireless terminal in response to receiving the Probe Request message from the wireless terminal;

transmitting, by the wireless terminal, in response to receiving the Probe Response message, an Association Request message for connecting the Wi-Fi link with the corresponding access point (AP), to the access point;

transmitting, by the access point (AP), an Association Response message to the wireless terminal in response to the Association Request message;

connecting the Wi-Fi link between the access point (AP) and the wireless terminal;

when the data transmission mode is switched at the access point (AP), transmitting, by the access point (AP), the Beacon signal comprising an arbitrary information field information on the switched data transmission mode to the wireless terminal through a network;

switching, by the wireless terminal, a currently set mode according to the Beacon signal comprising the switched data transmission mode information transmitted from the access point (AP);

transmitting a second association request message from the wireless terminal to the access point (AP) to re-connect with the access point (AP) in the switched data transmission mode; and transmitting a second association response message from the access point to the wireless terminal in response to the second association request message to connect a new Wi-Fi link between the wireless terminal and the access point in the switched data transmission mode.

2. The method according to claim 1, the data transmission mode and/or the switched data transmission mode comprise any one of a Plaintext mode, a WEP (wired equivalent privacy) mode, a WPA (Wi-Fi protected access) mode, and a QoS (Quality of Service) mode.

3. A method for detecting a data transmission mode in a wireless local area network system, the method comprising:

switching the data transmission mode in an access point and rebooting the access point;

transmitting a beacon frame from the access point and connecting a Wi-Fi link with a wireless terminal;

in the Wi-Fi link connected state, transmitting, by the wireless terminal, in response to receipt of the beacon frame, a probe request message to the access point;

when the probe request message is received from the wireless terminal, adding, by the access point, switched data transmission mode information to an arbitrary information field of a probe response message, and transmitting the probe response message comprising the switched data transmission mode information to the wireless terminal;

parsing, by the wireless terminal that receives the probe response message comprising the switched data transmission mode information from the access point, the arbitrary information field in the probe response message to detect the switched data transmission mode;

comparing, by the wireless terminal, the switched data transmission mode information with information of a currently set mode;

switching the wireless terminal from the currently set mode to the switched data transmission mode if the switched data transmission mode information differs from the information of the currently set mode;

transmitting an association request message from the wireless terminal to the access point to reconnect with the access point in the switched data transmission mode; and transmitting an association response message from the access point to the wireless terminal in response to the association request message to connect a new Wi-Fi link between the wireless terminal and the access point in the switched data transmission mode.

4. A wireless local area network (LAN) system, comprising:

a wireless terminal to receive a beacon frame and to transmit a probe request message in response to said beacon frame to search for an access point which transmitted said beacon frame;

the access point to receive said probe request message, transmitting a probe response message;

the wireless terminal to transmit a first association request message in response to the probe response message for connecting a Wi-Fi link with the access point;

the access point to transmit a first association response message to the wireless terminal in response to the association request message to establish the Wi-Fi link in a first data transmission mode;

the access point to switch from the first data transmission mode to a second data transmission mode while connected to the wireless terminal by the Wi-Fi link, and to transmit a next beacon frame comprising information regarding the second data transmission mode;

the wireless terminal to receive said next beacon frame and to detect the information regarding the second data transmission mode;

the wireless terminal to transmit a second association request message to the access point to connect with the access point in the second data transmission mode; and the access point to transmit a second association response message to the wireless terminal in response to the second association request message to establish a new Wi-Fi link connection in the second data transmission mode.

5. The wireless LAN system according to claim 4, wherein the first data transmission mode and/or the second data transmission mode comprise any one of a Plaintext mode, a WEP (wired equivalent privacy) mode, a WPA (Wi-Fi protected access) mode, and a QoS mode.

6. The wireless local area network (LAN) system as set forth in claim 4, further comprising:

the access point, if restarted and disconnected from the Wi-Fi link when switching from the first data transmission mode to the second data transmission mode, transmitting a new beacon frame;

the wireless terminal detecting a disconnection state with said access point when said beacon frame is not detected within a time period;

the wireless terminal, upon receiving said new beacon frame, connecting with said access point via the Wi-Fi link;

upon connection via the Wi-Fi link, the wireless terminal transmitting the probe request message to said access point when said disconnection state is detected;

the access point transmitting the probe response message to said wireless terminal in response to said probe request message transmitted when said disconnection state was recognized, said probe response message comprising the information regarding the second data transmission mode in an arbitrary field; and said wireless terminal, detecting said information regarding the second data transmission mode in said probe response message for the second data transmission mode and reconnecting, using said second data transmission mode, with said access point.

7. The wireless local area network (LAN) system as set forth in claim 6, wherein reconnecting with said access point comprises:

the wireless terminal transmitting the second association request message to the access point to reconnect with the access point in the second data transmission mode; and the access point transmitting the second association response message to the wireless terminal in response to the association request message to establish the new Wi-Fi link in the second data transmission mode.

8. A wireless local area network (LAN) system comprising:

an access point, if restarted and disconnected from a Wi-Fi link when switched from a first data transmission mode to a second data transmission mode, to transmit a beacon frame to reconnect with the Wi-Fi link;

a wireless terminal to detect a disconnection state with said access point when said beacon frame is not detected within a predetermined time period;

the wireless terminal, upon receiving said beacon frame, to connect with said access point via the Wi-Fi link;

upon connection via the Wi-Fi link, the wireless terminal to transmit a probe request message to said access point when said disconnection state is detected;

the access point to transmit a probe response message to said wireless terminal in response to said probe request message transmitted when said disconnection state is detected, said probe response message comprising information regarding the second data transmission mode in an arbitrary field; and the wireless terminal, to detect said information regarding the second data transmission mode in said probe response message for the second data transmission mode and to reconnect, using said second data transmission mode, with said access point, wherein reconnecting with said access point comprises:

the wireless terminal transmitting an association request message to the access point to reconnect in the second data transmission mode; and the access point transmitting an association response message to the wireless terminal in response to the association request message to establish a new Wi-Fi link in the second data transmission mode.

* * * * *